(12) United States Patent
Huang et al.

(10) Patent No.: US 11,935,517 B2
(45) Date of Patent: Mar. 19, 2024

(54) SPEECH DECODING METHOD AND APPARATUS, COMPUTER DEVICE, AND STORAGE MEDIUM

(71) Applicant: Tencent Technology (Shenzhen) Company Limited, Shenzhen (CN)

(72) Inventors: Yiheng Huang, Shenzhen (CN); Xiaozheng Jian, Shenzhen (CN); Liqiang He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 289 days.

(21) Appl. No.: 17/191,604

(22) Filed: Mar. 3, 2021

(65) Prior Publication Data

US 2021/0193123 A1 Jun. 24, 2021

Related U.S. Application Data

(63) Continuation of application No. PCT/CN2019/116686, filed on Nov. 8, 2019.

(30) Foreign Application Priority Data

Dec. 14, 2018 (CN) .......................... 201811536173.X

(51) Int. Cl.
*G10L 15/08* (2006.01)
*G10L 15/06* (2013.01)
*G10L 19/008* (2013.01)

(52) U.S. Cl.
CPC .......... *G10L 15/083* (2013.01); *G10L 15/063* (2013.01); *G10L 19/008* (2013.01); *G10L 2015/085* (2013.01); *G10L 2015/088* (2013.01)

(58) Field of Classification Search
CPC .................................................... G10L 19/008
See application file for complete search history.

(56) References Cited

U.S. PATENT DOCUMENTS 9,047,868 B1 * 6/2015 O'Neill ................ G10L 15/197
10,943,583 B1 * 3/2021 Gandhe ................ G10L 15/183
(Continued)

FOREIGN PATENT DOCUMENTS

CN 1455387 A 11/2003
CN 105513589 A 4/2016
(Continued)

OTHER PUBLICATIONS

I. Illina and Y. Gong, "Improvement in N-best search for continuous speech recognition," Proceeding of Fourth International Conference on Spoken Language Processing. ICSLP '96, Philadelphia, PA, USA, 1996, pp. 2147-2150 vol.4, doi: 10.1109/ICSLP.1996.607228. (Year: 1996).*

(Continued)

Primary Examiner — Richemond Dorvil
Assistant Examiner — Alexander G Marlow
(74) Attorney, Agent, or Firm — Morgan, Lewis & Bockius LLP

(57) ABSTRACT

A speech decoding method is performed by a computer device, the speech including a current audio frame and a previous audio frame. The method includes: obtaining a target token corresponding to a smallest decoding score from a first token list including first tokens obtained by decoding the previous audio frame, each first token including a state pair and a decoding score, the state pair being used for characterizing a correspondence between a first state of the first token in a first decoding network corresponding to a low-order language model and a second state of the first token in a second decoding network correspond- (Continued)

ing to a differential language model; determining pruning parameters according to the target token and an acoustic vector of the current audio frame when the current audio frame is decoded; and decoding the current audio frame according to the first token list, the pruning parameters, and the acoustic vector.

17 Claims, 4 Drawing Sheets

(56) References Cited

U.S. PATENT DOCUMENTS

| | | | |
|---|---|---|---|
| 11,017,778 B1* | 5/2021 | Thomson | H04M 3/42382 |
| 2003/0061046 A1 | 3/2003 | Zhao et al. | |
| 2004/0158457 A1* | 8/2004 | Veprek | G10L 15/30 704/E15.047 |
| 2014/0297267 A1* | 10/2014 | Spencer | G06F 3/04886 704/9 |
| 2016/0093292 A1* | 3/2016 | Hofer | G10L 15/02 704/240 |
| 2019/0279618 A1* | 9/2019 | Yadav | G06F 40/30 |

FOREIGN PATENT DOCUMENTS

| | | | | |
|---|---|---|---|---|
| CN | 105575386 A | 5/2016 | | |
| CN | 105654945 A | 6/2016 | | |
| CN | 105845128 A | 8/2016 | | |
| CN | 108288467 A | 7/2018 | | |
| CN | 108305634 A | 7/2018 | | |
| CN | 108682415 A | 10/2018 | | |
| CN | 110164421 A | 8/2019 | | |
| DE | 102018108856 A1 | 10/2018 | | |
| WO | WO-2012076895 A1 * | 6/2012 | | G10L 15/083 |

OTHER PUBLICATIONS

D. Nolden, R. Schlüter and H. Ney, "Extended search space pruning in LVCSR," 2012 IEEE International Conference on Acoustics, Speech and Signal Processing (ICASSP), Kyoto, Japan, 2012, pp. 4429-4432, doi: 10.1109/ICASSP.2012.6288902. (Year: 2012).*

Disclosed Anonymously, "Contextual Speech Recognition Using Rescoreaware Pruning" An IP.com Prior Art Database Technical Disclosure, IP.com No. IPCOM000252757D (Year: 2018).*

Y. Fujii, D. Genzel, A. ©.Popat and R. Teunen, "Label transition and selection pruning and automatic decoding parameter optimization for time-synchronous Viterbi decoding," 2015 13th International Conference on Document Analysis and Recognition, doi: 10.1109/ICDAR.2015.7333863 (Year: 2015).*

Takaaki Hori, Chiori Hori, and Yasuhiro Minam, "Fast On-The-Fly Composition for Weighted Finite-State Transducers in 1.8 Million-Word Vocabulary Continuous Speech Recognition" NTT Communication Science Laboratories, NTT Corporation 2-4 Hikaridai, Seika-cho, Soraku-gun, Kyoto, Japan (Year: 2004).*

D. Willett and S. Katagiri, "Recent advances in efficient decoding combining on-line transducer composition and smoothed language model incorporation," 2002 IEEE International Conference on Acoustics, Speech, and Signal Processing, doi: 10.1109/ICASSP. 2002.5743817 (Year: 2002).*

Y. Fujii, D. Genzel, A. C. Popat and R. Teunen, "Label transition and selection pruning and automatic decoding parameter optimization for time-synchronous Viterbi decoding," 2015 13th International Conference on Document Analysis and Recognition, doi: 10.1109/ICDAR .2015.7333863 (Year: 2015).*

Tencent Technology, ISR, PCT/CN2019/116686, Feb. 18, 2020, 3 pgs.

Tencent Technology, WO, PCT/CN2019/116686, Feb. 18, 2020, 5 pgs.

Tencent Technology, IPRP, PCT/CN2019/116686, Jun. 8, 2021, 6 pgs.

* cited by examiner

SPEECH DECODING METHOD AND APPARATUS, COMPUTER DEVICE, AND STORAGE MEDIUM

CROSS REFERENCE TO RELATED APPLICATIONS

This application is a continuation application of PCT Patent Application No. PCT/CN2019/116686, entitled "SPEECH DECODING METHOD AND APPARATUS, COMPUTER DEVICE, AND STORAGE MEDIUM", filed on Nov. 8, 2019, which claims priority to Chinese Patent Application No. 201811536173X, entitled "SPEECH DECODING METHOD AND APPARATUS, AND STORAGE MEDIUM", filed with the National Intellectual Property Administration, PRC on Dec. 14, 2018, both of which are incorporated herein by reference in their entirety.

FIELD OF THE TECHNOLOGY

This application relates to the field of speech recognition technologies, and in particular, to a speech decoding method and apparatus, a computer device, and a storage medium.

BACKGROUND OF THE DISCLOSURE

The speech recognition technology, also known as automatic speech recognition (ASR), is aimed at converting the vocabulary content of human speech into computer-readable input, including keystrokes, binary codes, and character sequences, so as to implement human-computer interaction. The speech recognition technology is applicable to a wide range of scenarios in modern life, for example, car navigation, smart home, voice dialing, and simultaneous interpretation. A decoder serves as the core of a speech recognition system. A decoder-based speech decoding process plays an important role in the entire speech recognition process and directly affects the accuracy of the recognition result.

At present, the decoder-based speech decoding process is: obtaining a high-order language model, generating a decoding network on the high-order language model by using a general-purpose openfst tool, and then performing speech decoding based on the decoding network.

However, the high-order language model consumes large memory, and the decoding network generated based on the high-order language model consumes much larger memory than the high-order language model does, which entails the configuration of huge storage resources and computing resources. As it is difficult to implement decoding in a scenario where storage resources and computing resources are limited, there is an urgent need for a speech decoding method that takes both the decoding speed and the decoding accuracy into account.

SUMMARY

According to embodiments provided in this application, a speech decoding method and apparatus, a computer device, and a storage medium are provided.

A speech decoding method is performed by a computer device, speech including a current audio frame and a previous audio frame; and the method including:
obtaining a target token corresponding to a smallest decoding score from a first token list, the first token list including a plurality of first tokens obtained by decoding the previous audio frame in different decoding networks, each first token including a state pair and a decoding score, the state pair being used for characterizing a correspondence between a first state of the first token in a first decoding network corresponding to a low-order language model and a second state of the first token in a second decoding network corresponding to a differential language model;
determining pruning parameters according to the target token and an acoustic vector of the current audio frame when the current audio frame is decoded, the pruning parameters being used for restricting a decoding process of the current audio frame; and decoding the current audio frame according to the first token list, the pruning parameters, and the acoustic vector.

A speech decoding apparatus is provided, performed by a computer device, speech including a current audio frame and a previous audio frame; and the apparatus including:
an obtaining module, configured to obtain a target token corresponding to a smallest decoding score from a first token list, the first token list including a plurality of first tokens obtained by decoding the previous audio frame in different decoding networks, each first token including a state pair and a decoding score, the state pair being used for characterizing a correspondence between a first state of the first token in a first decoding network corresponding to a low-order language model and a second state of the first token in a second decoding network corresponding to a differential language model;
a determining module, configured to determine pruning parameters according to the target token and an acoustic vector of the current audio frame when the current audio frame is decoded, the pruning parameters being used for restricting a decoding process of the current audio frame; and
a decoding module, configured to decode the current audio frame according to the first token list, the pruning parameters, and the acoustic vector.

A computer device is provided, including a processor and a memory, the memory storing computer-readable instructions, the computer-readable instructions, when executed by the processor, causing the processor to perform the operations of the speech decoding method.

A non-transitory computer-readable storage medium is provided, storing computer-readable instructions, the computer-readable instructions, when executed by one or more processors, causing the one or more processors to perform the operations of the speech decoding method.

Details of one or more embodiments of this application are provided in the drawings and descriptions below. Other features, objectives, and advantages of this application become apparent from the specification, the drawings, and the claims.

BRIEF DESCRIPTION OF THE DRAWINGS

To describe the technical solutions in the embodiments of this application more clearly, the accompanying drawings required for describing the embodiments are briefly described below. Apparently, the accompanying drawings in the following description show merely some embodiments of this application, and a person of ordinary skill in the art may obtain other accompanying drawings according to these accompanying drawings without creative efforts.

DESCRIPTION OF EMBODIMENTS

Figure 1:
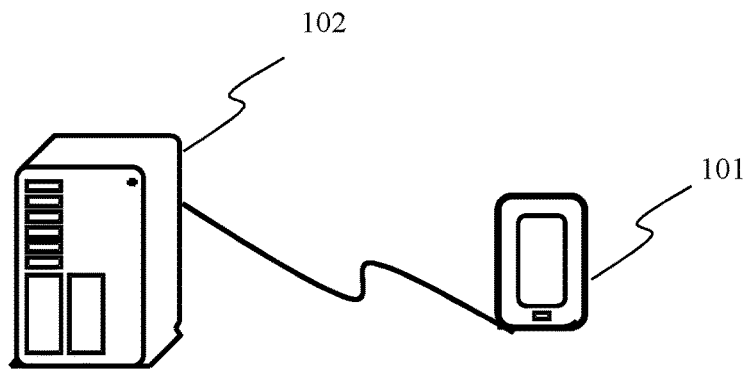
FIG. 1 shows an implementation environment involved in a speech decoding method according to an embodiment of this application.

To make the objectives, technical solutions, and advantages of this application clearer, the following further describes implementations of this application in detail with reference to the drawings.

First, symbols involved in this application are described.

<eps>: represents an empty symbol;

Ilabel: represents an input symbol;

Olable: represents an output symbol;

<s>: represents a start symbol;

State.A: represents a state of a token in a first decoding network corresponding to a low-order language model; and State.B: represents a state of a token in a second decoding network corresponding to a differential language model.

The following is an explanation of important terms involved in this application.

1. Weighted Finite-State Transducer (WFST) is used for large-scale speech recognition, and a state change of the WFST can be marked with an input symbol and an output symbol.

2. Token is a data structure that records a score and information of a state at a moment in a decoding process. Starting from an initial state of the WFST, the token is transferred along a directional edge, and the state change during the transfer process can be reflected by the change of the input symbol. In the process of state transfer from the initial state to an end state, a path formed by a series of states and edges is recorded in the token.

3. HCLG.fst is a decoding network formed by combining four fsts through a series of algorithms. The four fsts are H.fst, C.fst, L.fst, and G.fst.

G represents a language model, and input and output types of the model are the same. The language model is a representation of a language structure (including rules between words and sentences, such as grammar, and common collocations of words), and the probability of the language model is used to represent a probability of a sequence of language units appearing in a speech signal.

L represents a pronunciation dictionary model, into which monophone is inputted and which outputs words. The pronunciation dictionary model includes a collection of words and their pronunciation.

C represents a context correlation model, into which triphone is inputted and which outputs monophone. The context correlation model is used to indicate a correspondence between triphone and monophone.

H represents an acoustic model, which is a differentiated representation of acoustics, linguistics, environmental variables, speaker gender, accent, and the like. Acoustic models include hidden Markov model (HMM)-based acoustic models, for example, a Gaussian mixture model-hidden Markov model (GMM-HMM), and a deep neural network-hidden Markov model (DNN-HMM). The acoustic models further include end-to-end acoustic models, for example, connectionist temporal classification-long short-term memory (CTC-LSTM). Each state of the acoustic model represents the probability distribution of a speech feature of a speech unit in the state, and states are connected to form an ordered state sequence through the transfer between states.

4. Decoding network, also known as search space, uses various knowledge sources fused by the WFST including at least one of a language model, an acoustic model, a context correlation model, and a pronunciation dictionary model. For example, the decoding network is a single-factor decoding network composed of L and G and denoted as LG network; a C-level decoding network composed of C, L, and G and denoted as CLG network; or an HCLG network represented by the HMM.

5. Word output point represents a Chinese character output position.

6. Real-time factor represents a ratio of decoding time to audio time.

The following is an introduction of a speech recognition system involved in this application.

The speech recognition system is used for speech recognition, mainly including a preprocessing module, a feature extraction module, an acoustic model training module, a language model training module, and a decoder.

The preprocessing module is configured to process an inputted original speech signal, filter out unimportant information and background noise, and perform endpoint detection (find out the beginning and end of the speech signal), speech framing (it is approximately considered that the speech signal is transitorily stable within 10-30 ms, and the speech signal is divided into segments for analysis) and pre-emphasis (boost high-frequency parts) and other processing on the speech signal.

The feature extraction module is configured to remove redundant information that is useless for speech recognition from the speech signal, retain information that can reflect essential characteristics of the speech, and express the information in a certain form. The feature extraction module is configured to extract key feature parameters reflecting features of the speech signal to form a feature vector sequence for subsequent processing.

The acoustic model training module is configured to train acoustic model parameters according to feature parameters of a training speech library. During recognition, feature parameters of to-be-recognized speech can be matched with the acoustic model parameters to obtain a recognition result. Most of the current mainstream speech recognition systems adopt a hidden Markov model (HMM) for acoustic model modeling.

The language model training module is configured to analyze grammar and semantics of a training text database, and obtain the language model through training of a statistics-based model. The language model is trained mainly by using a rule-based model and a statistics-based model. In essence, the language model is a probability model that calculates an appearance probability of any sentence. The establishment of the language model can effectively combine the knowledge of Chinese grammar and semantics, and describe an internal relationship between words. When recognition is performed based on the trained language model, the recognition rate can be improved and the search range can be narrowed down.

In the process of speech recognition, for an inputted speech signal, the decoder can construct a decoding network based on the trained acoustic model, language model and pronunciation dictionary model, and search for the best path in the decoding network by using a search algorithm. The best path searched out by the decoder can output the word string of the speech signal with a maximum probability, so that the vocabulary content included in the speech signal can be determined.

In an embodiment of this application, a hardware environment of the decoder includes: two 14-core CPUs (E5-2680v4), 256 G memory, Raid (redundant array of independent disks), 2*300 SAS, 6*800 G SSD (solid state drive), 2*40 G network port (optical port, multi-mode), and 8*GPU 2.4 GHz, and the model of each GPU is the Tesla M40 24 GB graphics card.

The following is an introduction of application implementation scenarios of this application.

The speech decoding method provided in the embodiments of this application is applicable to various scenarios where the speech recognition function needs to be used, for example, a smart home scenario, a speech input scenario, a car navigation scenario, and a simultaneous interpretation scenario. In the foregoing application scenarios, an implementation environment involved in an embodiment of this application may include a terminal 101 and a server 102.

The terminal 101 may be a smartphone, a notebook computer, a tablet computer, or other devices. The terminal 101 may obtain relevant data for speech recognition from the server 102 in advance, and store the obtained data in a memory. After a speech signal is collected by a microphone or other devices, a processor in the terminal 101 calls the data stored in the memory to perform speech decoding on the collected speech signal. An application with a speech recognition function can be further installed on the terminal 101. After a speech signal is collected by a microphone or other devices, the collected speech signal is uploaded to the server 102 based on the installed application, and the server 102 performs speech decoding to obtain corresponding speech services.

The server 102 is provided with a speech recognition system and therefore can provide speech recognition services to the terminal 101.

The following is a difference comparison of this application and the existing speech decoding process.

Figure 2:
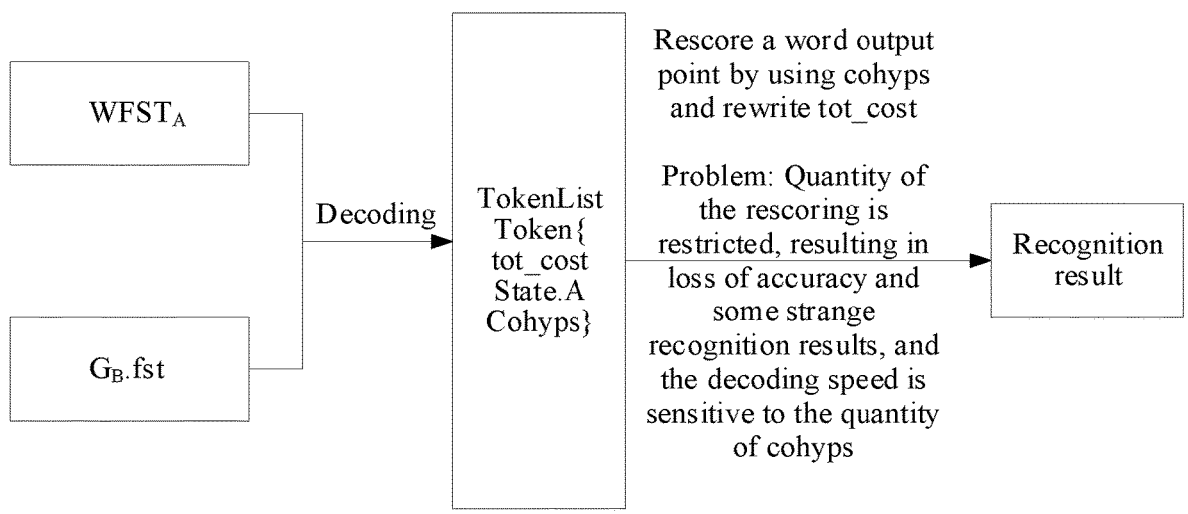
FIG. 2 is a diagram of a decoding principle of an existing speech decoding method.

FIG. 2 is a schematic diagram of a speech decoding process of the related art. Referring to FIG. 2, the related art denotes a first decoding network corresponding to a low-order language model as $WFST_A$, a state of a token in $WFST_A$ as State.A, a second decoding network corresponding to a high-order language model as $WFST_B$, and a state of the token in $WFST_B$ as State.B. The related art uses cohyps (co-hypothesis set) to record different hypotheses of State.A in $WFST_B$ and states corresponding to the hypotheses. Usually the quantity of states of a high-order language model is several orders of magnitude more than the quantity of states of a low-order language model. The same state of a low-order language model may correspond to many different states of a high-order language model. However, the related art sets the quantity of cohyps to 15 according to an empirical value, and this uniform limitation leads to incompletely equivalent decoding results and then causes a loss of accuracy.

Figure 3:
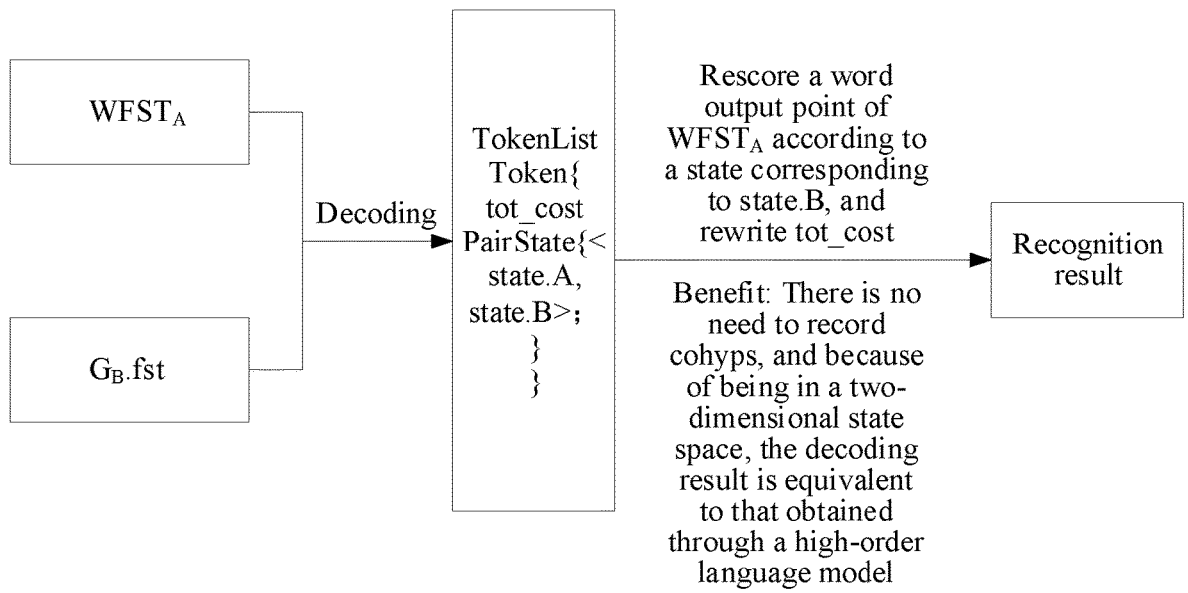
FIG. 3 is a diagram of a decoding principle of a speech decoding method according to an embodiment of this application.

To resolve the problem in the related art, an embodiment of this application provides a speech decoding method. Referring to FIG. 3, an embodiment of this application uses a state pair <state.A, state.B> to record a decoding state instead of limiting the total quantity of the state.B corresponding to the state.A. In this case, a decoding result which is completely equivalent to that of the high-order language model can be obtained without a loss of accuracy.

Figure 4:
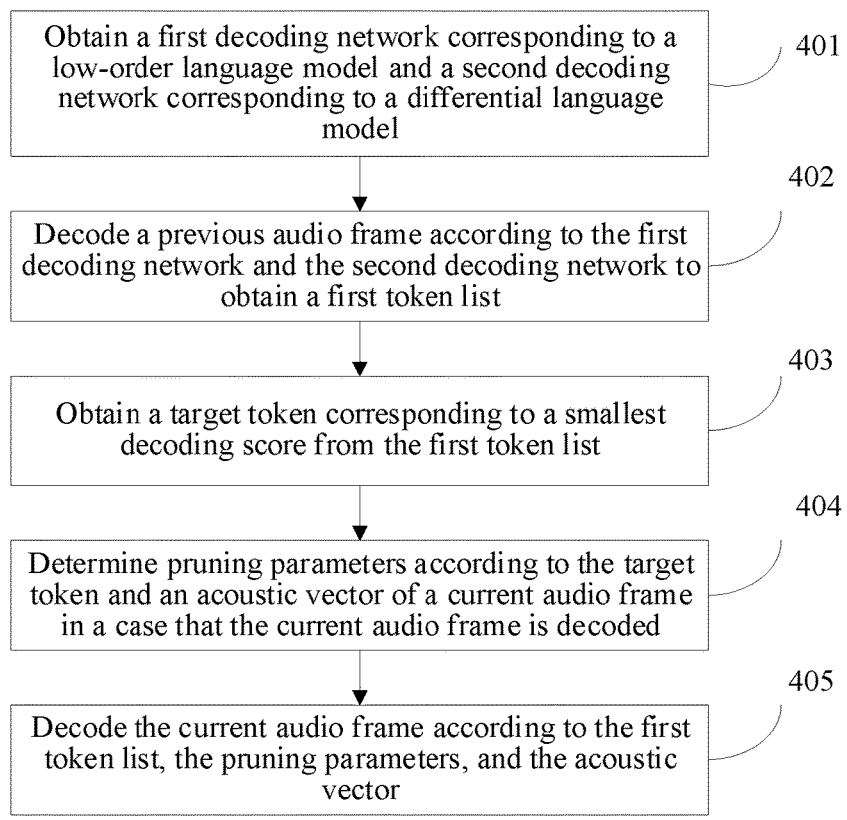
FIG. 4 is a flowchart of a speech decoding method according to an embodiment of this application.

An embodiment of this application provides a speech decoding method. Referring to FIG. 4, the process of the method provided in this embodiment of this application includes:

401: A terminal obtains a first decoding network corresponding to a low-order language model and a second decoding network corresponding to a differential language model.

For the first decoding network, the terminal may obtain a low-order language model from a server, and then generate the first decoding network corresponding to the low-order language model by using a model conversion tool (such as openfst) based on the obtained low-order language model.

For the second decoding network, the terminal may obtain a differential language model from the server, and then generate the second decoding network corresponding to the differential language model by using a model conversion tool (such as openfst) based on the obtained differential language model.

Before the terminal obtains the low-order language model and the high-order language model from the server, the server needs to first obtain the high-order language model, and then obtain the low-order language model and the differential language model based on the high-order language model.

Specifically, the process of obtaining the high-order language model is: the server obtains a large quantity of basic phonemes, performs grammatical analysis on each basic phoneme, obtains class relationships between each basic phoneme and other basic phonemes, and then connects each basic phoneme and a low-order basic phoneme thereof by using a back edge based on an analysis result. An input symbol and an output symbol on the back edge are empty, and a weight on the back edge is a backoff weight corresponding to each basic phoneme. Then the server uses the low-order basic phonemes of the basic phoneme as the starting point and the basic phoneme as the end point, and uses an edge to connect the points. An input symbol and an output symbol of the edge are the basic phoneme, and a weight on the edge is a log probability corresponding to the basic phoneme. Then the server uses a network formed by basic phonemes, edges between the basic phonemes, and the back edge as the high-order language model. The basic phonemes are commonly used characters, words or sentences in the Chinese language database. A basic phoneme can be expressed as ngram. Depending on the quantity of characters contained, the basic phoneme includes first-order ngram, second-order ngram, third-order ngram, and the like. To distinguish between different basic phonemes, each basic phoneme has a state ID. The high-order language model is actually obtained by connecting circles that characterize the basic phoneme with directional edges. Each edge is marked with an input symbol, an output symbol, and a weight.

Further, during the construction of the high-order language model, the server can obtain the quantity of edges corresponding to the basic phoneme, and then allocate memory for the high-order language model based on the quantity of edges corresponding to the basic phoneme, thereby avoiding a failure of high-order language model construction caused by memory insufficiency. Considering the limited memory, in the process of constructing the high-order language model, the server can clear the basic phonemes written in the memory when the quantity of the basic phonemes for grammatical analysis reaches a preset number, for example, 10 million, and write the basic phonemes in the memory into a disk until all the basic phonemes are analyzed. The memory consumed by the high-order language model can be greatly reduced by using this method.

The following method can be used to actually obtain a high-order language model above 50 G at the industrial level.

1. Obtain a large quantity of ngrams, the ngrams including first-order ngram, second-order ngram, ..., $n^{th}$-order ngram, and the like, parse (grammatically describe or analyze) each ngram for the first time, and record state IDs corresponding to the ngram and the quantity of edges corresponding to each ngram state.

2. Parse the ngram for the second time, and allocate corresponding memory in advance according to the quantity of edges corresponding to the ngram state.

3. Connect low-order ngram states of any ngram by using a back edge. The input character and the output character on the back edge are both empty. The weight on the back edge is the backoff weight corresponding to the current ngram. Through the connection of the back edge, the low-order state (that is, the historical state) corresponding to the current ngram state can be determined, and then an edge is used to connect an ID corresponding to the historical state to an ID corresponding to the current ngram state. The input symbol and the output symbol on this edge are both the current ngram, and the weight on this edge is a log probability corresponding to the ngram.

When the foregoing method is used to parse 10 million ngrams, the states of the ngrams can be written into the disk, and the information corresponding to the states that have been written into the memory can be cleared until the parsing of all the ngrams finishes. When this method is used to generate a high-order language model corresponding to ngrams above 100 G, the memory consumed is about 200 G, which saves a large quantity of memory compared with the existing high-order language model construction method.

Based on the generated high-order language model, the server performs order reduction processing on the high-order language model to remove some less important basic phonemes to obtain the low-order language model.

Based on the generated high-order language model and low-order language model, the server can obtain the differential language model by performing differential calculation on the high-order language model and the low-order language model. When the server performs the differential calculation, the formula used is as follows:

$$\log P_{diff}(w|h) = \log P_2(w|h) - \log P_1(w|h) \quad (1)$$

$$\alpha_{diff}(h) = \alpha_2(h) - \alpha_1(h) \quad (2),$$

where $P_{diff}(w|h)$ is a probability of a differential language model, $P_2(w|h)$ is a probability of a high-order language model, $P_1(w|h)$ is a probability of a low-order language model, and $\alpha$ is a score at the time of backoff.

The premise that the differential language model can be expressed by the foregoing formula (1) and formula (2) is that an ngram set of the low-order language model is a subset of an ngram set of the high-order language model. If this premise is met, when the high-order language model backs off, the low-order language model definitely backs off, and the differential language model can be expressed in the form of the backoff language model in formula (1) and formula (2). If the ngram set of the high-order language model is not a superset of the low-order language model, when the high-order language model backs off, the low-order language model does not necessarily back off, and the differential language model cannot be expressed in the form of the backoff language model in formula (1) and formula (2), which may lead to potential incorrect calculation during decoding.

402: The terminal decodes a previous audio frame according to the first decoding network and the second decoding network to obtain a first token list.

In a speech recognition scenario, after a speech signal is collected by a microphone or other devices, the terminal divides the speech signal into a plurality of audio frames according to a preset time length, and decodes the plurality of audio frames one by one. Before decoding, the terminal first initializes tokens included in the token list to obtain an initial token. The first state state.A corresponding to the initial token in the first decoding network is an initial state, and the second state state.B corresponding to the initial token in the second decoding network is also an initial state, that is, the state pair <state.A, state.B> in the initial token is <0, 0>, and a decoding score corresponding to the initial token is also 0. Then, based on the initial token, the terminal obtains the first token list corresponding to the previous audio frame by decoding the plurality of audio frames. The first token list includes the plurality of first tokens obtained by decoding the previous audio frame, the first token includes a state pair and a decoding score formed by decoding in different decoding networks, and the state pair is used for characterizing a correspondence between a first state in a first decoding network corresponding to a low-order language model and a second state in a second decoding network corresponding to a differential language model.

If the previous audio frame is a first audio frame, the terminal inputs the previous audio frame into the first decoding network, and traverses all empty input edges starting from the state.A of the initial token. For any empty input edge, if the edge is an edge without a word output point, the state of state.B in the initial token remains unchanged; and if the edge is an edge with a word output point, a decoding score tot_cost in the first decoding network and a word of the word output point are obtained, and whether there is an edge where the input symbol and the word of the word output point are the same in the second decoding network is queried by using the current state of state.B as a start state. If it is found that there is no edge where the input symbol and the word of the word output point are the same in the second decoding network, the back edge is used to back off, and the query continues in the backoff state until an edge where the input symbol and the output symbol are the same is found. If an edge where the input symbol and the word of the word output point are the same is found, the state.A jumps to the next state of the edge of the word output point to obtain an updated state.A, and the state.B jumps to the next state of the edge where the input symbol and the word of the word output point are the same to obtain an updated state.B. The updated state.A and the updated state.B are formed into a state pair, the decoding path formed in the second decoding network is rescored, and the sum of the rescoring score and the decoding score in the first decoding network is used as a new tot_cost. Then the initial token is updated with the new tot_cost and the new state pair <state.A, state.B>, and the updated token is added to the updated token list, which can be expressed as a newtokenlist.

The foregoing process is repeated until all the empty input edges are traversed. The foregoing process is performed recursively for the tokens in the obtained newtokenlist until no new token is added to the newtokenlist, and no token with a smaller decoding score is formed in the same state pair. The terminal copies the tokens in the newtokenlist to the first token list and clears the tokens in the newtokenlist. The first token list can be expressed as a curtokenlist.

If the previous audio frame is not the first audio frame, a process in which the terminal decodes the previous audio frame according to the first decoding network and the second decoding network to obtain the first token list is the same as the process in which the terminal decodes the current audio frame to obtain the second token list, and details are revealed in the following process. The difference is that the previous audio frame is decoded with reference to a previous audio frame of the previous audio frame, and the current audio frame is decoded with reference to a previous audio frame of the current audio frame.

403: The terminal obtains a target token corresponding to a smallest decoding score from the first token list.

According to the decoding score, the terminal obtains an optimal token with the smallest decoding score from the first token list, and the optimal token is the target token.

404: The terminal determines pruning parameters according to the target token and an acoustic vector of a current audio frame when the current audio frame is decoded.

The pruning parameters include a first pruning parameter, a second pruning parameter, and a third pruning parameter, where the first pruning parameter can be expressed as curcutoff, and is used for determining whether to skip any first token before decoding is performed based on each first token in the first token list; the second pruning parameter can be expressed as am_cutoff, and is used for determining whether to skip any first token when the first decoding network performs decoding based on each first token in the first token list; and the third pruning parameter can be expressed as nextcutoff, and is used for determining whether to skip any first token when the second decoding network performs decoding based on each first token in the first token list.

The following are steps of the terminal determining pruning parameters according to the target token and an acoustic vector of a current audio frame when the current audio frame is decoded.

4041: The terminal obtains a decoding score corresponding to the target token, and determines a first pruning parameter according to a preset value and the decoding score corresponding to the target token.

The terminal obtains the decoding score corresponding to the target token, and determines a sum of the preset value and the decoding score corresponding to the target token as the first pruning parameter. The preset value can be set by research and development personnel, and the preset value is generally 10. The preset value can be expressed as config-.beam, and the first pruning parameter can be expressed as curcutoff=tot_cost+config.beam.

4042: The terminal inputs the acoustic vector into the first decoding network, traverses non-empty input edges in the first decoding network by using a first state of the target token as a start state, and updates a second initial pruning parameter according to a first decoding path formed by each non-empty input edge, to obtain a second pruning parameter.

The second initial pruning parameter is generally set to infinity. The update process of the second initial pruning parameter is: the terminal traverses the non-empty input edges by using the first state state.A of the target token as the start state; for the first decoding path formed by any non-empty input edge, the terminal obtains the first acoustic score of the first decoding path under the acoustic model, and updates the second initial pruning parameter according to a score determined by the first acoustic score, the preset value, and the decoding score corresponding to the target token, to obtain the second pruning parameter. The terminal obtains a total score obtained by adding twice the first acoustic score, the preset value, and the decoding score corresponding to the target token. If the total score is less than the second initial pruning parameter, the second initial pruning parameter is updated; and if the total score is greater than the second initial pruning parameter, the second initial pruning parameter is not updated. When the first decoding path formed by all the non-empty input edges is used to continuously update the second initial pruning parameter, the second pruning parameter can be finally obtained.

4043: The terminal rescores the first decoding path formed by the non-empty input edge in the second decoding network by using a second state of the target token as a start state, and updates a third initial pruning parameter according to a rescoring result, to obtain a third pruning parameter.

The third initial pruning parameter is generally set to infinity. The update process of the third initial pruning parameter is as follows:

40431: For the first decoding path formed by any non-empty input edge, the terminal obtains a first acoustic score of the first decoding path under an acoustic model.

40432: The terminal obtains a first path score of the first decoding path in the first decoding network.

The terminal adds weights of edges in the first decoding path to obtain the first path score.

40433: The terminal obtains a first rescoring score of the first decoding path in the second decoding network.

This step includes the following situations:

In a first situation, when no word output point exists on the first decoding path formed by the non-empty input edges, the terminal cannot obtain a to-be-queried word. In this case, there is no need to perform rescoring in the second decoding network, and the first rescoring score of the first decoding path in the second decoding network is 0.

In a second situation, when a word output point exists on the first decoding path formed by the non-empty input edges, the terminal obtains a word of the word output point, and queries whether there is an edge where the input symbol and the word of the word output point are the same in the second decoding network by using the second state of the target token as a start state. If it is found that there is no edge where the input symbol and the word of the word output point are the same in the second decoding network, the back edge is used to back off. The query continues in the backoff state until an edge where the input symbol and the output symbol are the same is found, and a weight on each edge from the second state to the final state is used as the first rescoring score. If it is found that there is an edge where the input symbol and the word of the word output point are the same in the second decoding network, a weight on the edge where the input symbol is the same as the word of the word output point is obtained, and the weight is the first rescoring score.

40434: The terminal updates the third initial pruning parameter according to a score determined by the first acoustic score, the first path score, the first rescoring score, the preset value, and the decoding score corresponding to the target token, to obtain the third pruning parameter.

The terminal obtains a total score of the first acoustic score, the first path score, the first rescoring score, the preset value, and the decoding score corresponding to the target token. If the total score is less than the third initial pruning parameter, the third initial pruning parameter is updated to the total score; and if the total score is greater than the third initial pruning parameter, the third initial pruning parameter is not updated. When the first decoding path formed by all the non-empty input edges is used to continuously update the third initial pruning parameter, the third pruning parameter can be finally obtained.

405: The terminal decodes the current audio frame according to the first token list, the pruning parameters, and the acoustic vector.

The following are steps of the terminal decoding the current audio frame according to the first token list, the pruning parameters, and the acoustic vector.

4051: The terminal inputs the acoustic vector into the first decoding network, and traverses each first token in the first token list.

4052: For any first token, the terminal determines whether to skip the first token according to a decoding score corresponding to the first token and the first pruning parameter.

The terminal obtains the decoding score corresponding to the first token and compares the decoding score of the first token with the first pruning parameter. If the decoding score of the first token is greater than the first pruning parameter, the first token is skipped; and if the decoding score of the first token is less than the first pruning parameter, it is determined to execute the first token.

4053: In a case that it is determined to execute the first token, the terminal traverses non-empty input edges in the first decoding network by using the first state of the first token as a start state, and determines whether to skip the first token according to the second pruning parameter and a second decoding path formed by each non-empty input edge.

When it is determined to execute the first token according to the first pruning parameter, the terminal traverses the non-empty input edges in the first decoding network by using the first state of the first token as the start state. For the second decoding path formed by any non-empty input edge, the second acoustic score of the second decoding path under the acoustic model is obtained, and the score determined by the second acoustic score and the decoding score corresponding to the first token is compared with the second pruning parameter. The first token is skipped when a score determined by the second acoustic score and the decoding score corresponding to the first token is greater than the second pruning parameter; otherwise, the first token is executed. Specifically, the terminal obtains a total score of twice the second acoustic score, and the decoding score corresponding to the first token. If the total score is greater than the second pruning parameter, the first token is skipped; and if the total score is less than the second pruning parameter, the first token is executed.

Further, when it is determined to execute the first token according to the second pruning parameter, if the score determined by the second acoustic score, the preset value, and the decoding score corresponding to the first token is less than the second pruning parameter, the terminal updates the second pruning parameter. Specifically, the terminal obtains a total score of twice the second acoustic score, the preset value, and the decoding score corresponding to the first token. If the total score is less than the second pruning parameter, the second pruning parameter is updated to the total score; and if the total score is greater than the second pruning parameter, the second pruning parameter is not updated. After the second pruning parameter is updated, whether to skip any first token is determined according to the updated second pruning parameter.

4054: In a case that it is determined to execute the first token, the terminal rescores the second decoding path formed by the non-empty input edge in the second decoding network by using the second state of the first token as a start state, and determines whether to skip the first token according to a rescoring result and the third pruning parameter.

When it is determined to execute the first token according to the second pruning parameter, the terminal rescores the second decoding path formed by the non-empty input edge in the second decoding network by using the second state of the first token as a start state.

In a first situation, for the second decoding path formed by any non-empty input edge, the terminal obtains a second acoustic score of the second decoding path under an acoustic model. If no word output point exists on the second decoding path formed by the non-empty input edge, the terminal obtains a second path score of the second decoding path in the first decoding network. If a score determined by the decoding score of the first token, the second path score, and the second acoustic score, is greater than the third pruning parameter, the first token is skipped; otherwise, the first token is executed. Specifically, the terminal obtains a total score of the decoding score of the first token, the second path score, and the second acoustic score. If the total score is greater than the third pruning parameter, the first token is skipped; and if the total score is less than the third pruning parameter, the first token is executed.

Further, when it is determined to execute the first token according to the third pruning parameter, the terminal obtains a total score of the decoding score of the first token, the second path score, the second acoustic score, and the preset value. If the total score is less than the third pruning parameter, the third pruning parameter is updated to the total score; and if the total score is greater than the third pruning parameter, the third pruning parameter is not updated. After the third pruning parameter is updated, whether to skip any first token is determined according to the updated third pruning parameter.

In a second situation, for the second decoding path formed by any non-empty input edge, the terminal obtains a second acoustic score of the second decoding path under an acoustic model and a second path score of the second decoding path in the first decoding network. When a word output point exists on the second decoding path formed by the non-empty input edges, the terminal obtains a word of the word output point, and queries whether there is an edge where the input symbol and the word of the word output point are the same in the second decoding network by using the second state of the first token as a start state. If it is found that there is no edge where the input symbol and the word of the word output point are the same in the second decoding network, the back edge is used to back off. The query continues in the backoff state until an edge where the input symbol and the output symbol are the same is found, and a weight on each edge from the second state to the final state is used as the second rescoring score. If it is found that there is an edge where the input symbol and the word of the word output point are the same in the second decoding network, a weight on the edge where the input symbol is the same as the word of the word output point is obtained, and the weight is the second rescoring score. Based on the obtained second rescoring score, the terminal obtains a score determined by the decoding score of the first token, the second path score, the second acoustic score, and the second rescoring score. If the score determined by the decoding score of the first token, the second path score, the second acoustic score, and the second rescoring score is greater than the third pruning parameter, the first token is skipped; otherwise, the first token is executed.

Further, when it is determined to execute the first token according to the third pruning parameter, the terminal obtains a total score determined by the decoding score of the first token, the second path score, the second acoustic score, the second rescoring score, and the preset value. If the total score is less than the third pruning parameter, the third pruning parameter is updated to the total score; and if the total score is greater than the third pruning parameter, the third pruning parameter is not updated. After the third pruning parameter is updated, whether to skip any first token is determined according to the updated third pruning parameter.

4055: In a case that it is determined to execute the first token, the terminal obtains a second token by performing a state jump on the first token, the second token including an updated state pair and a decoding score.

When it is determined to execute the first token according to the third pruning parameter, the terminal performs a state jump on the first state in the first token according to a traversal result in the first decoding network, to obtain an updated first state, performs a state jump on the second state in the first token according to the rescoring result in the second decoding network, to obtain an updated second state, then combines the updated first state and the updated second state into the state pair of the second token, and determines the decoding score corresponding to the second token according to the path score in the first decoding network, the rescoring score in the second decoding network, the second acoustic score under the acoustic model, and the decoding score corresponding to the first token.

Specifically, when a state jump is performed on the first token, the following situations are included.

When no edge of a word output point exists on the second decoding path formed by the non-empty input edges, the terminal jumps the first state of the first token to the next state of the non-empty input edges, and the second state of the first token remains unchanged.

When an edge of a word output point exists on the second decoding path formed by the non-empty input edges, the terminal jumps the first state of the first token to the next state of the edge of the word output point, and jumps the second state of the first token to the next state of an edge where the input symbol and the output symbol are the same.

4056: The terminal combines second tokens corresponding to all the first tokens into a second token list.

After the second token is obtained, the terminal adds the second token to the second token list until each first token in the first token list is traversed. The second token list is the curtokenlist of the current audio frame.

4057: The terminal determines a second token with a smallest decoding score in the second token list as a decoding result of the current audio frame.

Based on the obtained second token list, the terminal obtains a second token with a smallest decoding score in the second token list and determines the second token as a decoding result of the current audio frame.

The foregoing takes, as an example, the decoding the current audio frame according to the first token list of the previous audio frame, the first decoding network, and the second decoding network, and for the decoding of other audio frames, reference can be made to the foregoing decoding method, which is not repeated.

In another embodiment of this application, the terminal may dynamically expand a decoding path through a dictionary model, and then perform dynamic rescoring and pruning processes by using a language model. Demanding less resources, this method does not need to generate TLG resources that combine a dictionary model and a language model, and only a G.fst network of a related language model needs to be generated.

Figure 5:
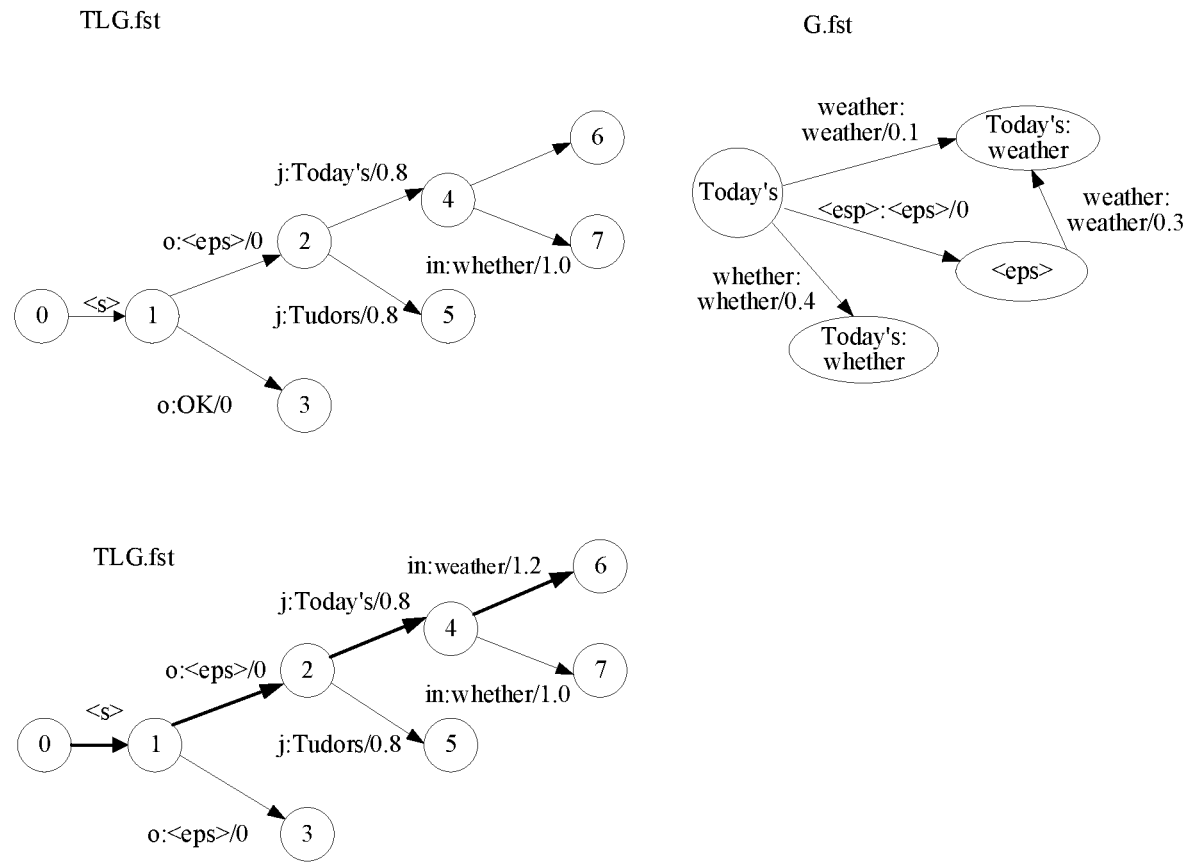
FIG. 5 is a schematic diagram of a speech decoding process according to an embodiment of this application.

FIG. 5 is a schematic diagram of performing a decoding process by using decoding networks corresponding to different language models. Referring to FIG. 5, when decoding is performed on a TLG.fst (a low-order language model), a decoding result corresponding to a decoding path 0-1-2-4-6 is "Today's weather", and a decoding score is 0+0.8+1.2=2.0; and a decoding result corresponding to a decoding path 0-1-2-4-7 is "Today's whether", and a decoding score is 0+0.8+1.0=1.8. Through a comparison of the two results, the decoding score of "today's whether" is smaller than that of "Today's weather", and therefore the result "today's whether" is better. However, after rescoring of a G.fst (a differential language model), a rescoring score of "weather" is 0.1, and a total score of the decoding path 0-1-2-4-6 is 2.1; and a rescoring score of "whether" is 0.4, and a total score of the decoding path 0-1-2-4-7 is 1.8+0.4=2.2. After the rescoring, the total score 2.1 of "Today's weather" is less than the total score 2.2 of "Today's whether", and therefore the finally outputted decoding result is "Today's weather".

The foregoing takes the terminal performing speech decoding as an example. In practical applications, the terminal may send collected speech data to the server and obtain a speech decoding result from the server instead of directly performing decoding.

According to the method provided in the embodiments of this application, a decoding network corresponding to a high-order language model does not need to be generated, and decoding can be performed based on a decoding network corresponding to a low-order language model and a differential language model, which saves computing resources and storage resources without losing decoding accuracy. In addition, decoding a current audio frame according to a decoding result of a previous audio frame improves the decoding speed.

Figure 6:
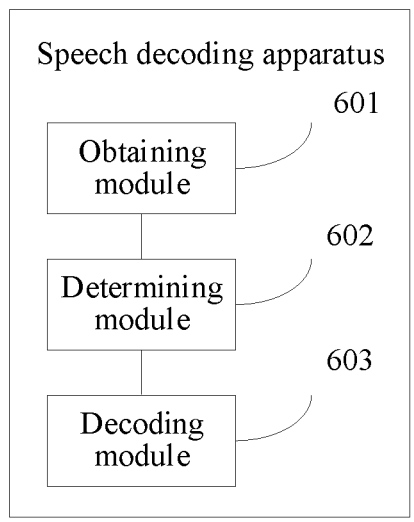
FIG. 6 is a schematic structural diagram of a speech decoding apparatus according to an embodiment of this application.

Referring to FIG. 6, an embodiment of this application provides a speech decoding apparatus, including:

an obtaining module 601, configured to obtain a target token corresponding to a smallest decoding score from a first token list, the first token list including a plurality of first tokens obtained by decoding a previous audio frame, the first token including a state pair and a decoding score formed by decoding in different decoding networks, the state pair being used for characterizing a correspondence between a first state in a first decoding network corresponding to a low-order language model and a second state in a second decoding network corresponding to a differential language model;

a determining module 602, configured to determine pruning parameters according to the target token and an acoustic vector of the current audio frame when the current audio frame is decoded, the pruning parameters being used for restricting a decoding process of the current audio frame; and a decoding module 603, configured to decode the current audio frame according to the first token list, the pruning parameters, and the acoustic vector.

In another embodiment of this application, the determining module 602 is configured to obtain a decoding score corresponding to the target token, and determine the first pruning parameter according to a preset value and the decoding score corresponding to the target token; input the acoustic vector into the first decoding network, traverse non-empty input edges in the first decoding network by using a first state of the target token as a start state, and update a second initial pruning parameter according to a first decoding path formed by each non-empty input edge, to obtain a second pruning parameter; and rescore the first decoding path formed by the non-empty input edge in the second decoding network by using a second state of the target token as a start state, and update a third initial pruning parameter according to a rescoring result, to obtain a third pruning parameter.

In another embodiment of this application, for the first decoding path formed by any non-empty input edge, the determining module 602 is configured to obtain a first acoustic score of the first decoding path under an acoustic model; and update the second initial pruning parameter according to a score determined by the first acoustic score, the preset value, and the decoding score corresponding to the target token, to obtain the second pruning parameter.

In another embodiment of this application, for the first decoding path formed by any non-empty input edge, the determining module 602 is configured to obtain a first acoustic score of the first decoding path under an acoustic model; obtain a first path score of the first decoding path in the first decoding network; obtain a first rescoring score of the first decoding path in the second decoding network; and update the third initial pruning parameter according to a score determined by the first acoustic score, the first path score, the first rescoring score, the preset value, and the decoding score corresponding to the target token, to obtain the third pruning parameter.

In another embodiment of this application, the decoding module 603 is configured to input the acoustic vector into the first decoding network, and traverse each first token in the first token list; for any first token, determine whether to skip the first token according to a decoding score corresponding to the first token and the first pruning parameter; traverse non-empty input edges in the first decoding network by using the first state of the first token as a start state when it is determined to execute the first token, and determine whether to skip the first token according to the second pruning parameter and a second decoding path formed by each non-empty input edge; rescore the second decoding path formed by the non-empty input edge in the second decoding network by using the second state of the first token as a start state when it is determined to execute the first token, and determine whether to skip the first token according to a rescoring result and the third pruning parameter; obtain a second token by performing a state jump on the first token when it is determined to execute the first token, the second token including an updated state pair and a decoding score; combine second tokens corresponding to all the first tokens into a second token list; and determine a second token with a smallest decoding score in the second token list as a decoding result of the current audio frame.

In another embodiment of this application, for the second decoding path formed by any non-empty input edge, the decoding module 603 is configured to obtain a second acoustic score of the second decoding path under an acoustic model; and skip the first token when a score determined by the second acoustic score and the decoding score corresponding to the first token is greater than the second pruning parameter; otherwise, execute the first token.

In another embodiment of this application, the apparatus further includes:

an update module, configured to update the second pruning parameter when a score determined by the second acoustic score, the preset value, and the decoding score corresponding to the first token is less than the second pruning parameter.

In another embodiment of this application, for the second decoding path formed by any non-empty input edge, the decoding module 603 is configured to obtain a second acoustic score of the second decoding path under an acoustic model; obtain a second path score of the second decoding path in the first decoding network when no word output point exists on the non-empty input edge; and skip the first token when a score determined by the decoding score of the first token, the second path score, and the second acoustic score is greater than the third pruning parameter; otherwise, execute the first token.

In another embodiment of this application, the apparatus further includes:

an update module, configured to update the third pruning parameter when a score determined by the decoding score of the first token, the second path score, the second acoustic score, and the preset value is less than the third pruning parameter.

In another embodiment of this application, for the second decoding path formed by any non-empty input edge, the decoding module 603 is configured to obtain a second acoustic score of the second decoding path under an acoustic model; obtain a second path score of the second decoding path in the first decoding network when a word output point exists on the non-empty input edge; obtain a second rescoring score of the second decoding path in the second decoding network; and skip the first token when a score determined by the decoding score of the first token, the second path score, the second acoustic score, and the second rescoring score is greater than the third pruning parameter; otherwise, execute the first token.

In another embodiment of this application, the apparatus further includes:

an update module, configured to update the third pruning parameter when a score determined by the decoding score of the first token, the second path score, the second acoustic score, the second rescoring score, and the preset value is less than the third pruning parameter.

In another embodiment of this application, the decoding module 603 is configured to perform a state jump on the first state in the first token according to a traversal result in the first decoding network, to obtain an updated first state; perform a state jump on the second state in the first token according to the rescoring result in the second decoding network, to obtain an updated second state; combine the updated first state and the updated second state into the state pair of the second token; and determine the decoding score corresponding to the second token according to the path score in the first decoding network, the rescoring score in the second decoding network, the second acoustic score under the acoustic model, and the decoding score corresponding to the first token.

In summary, according to the apparatus provided in the embodiments of this application, a decoding network corresponding to a high-order language model does not need to be generated, and decoding can be performed based on a decoding network corresponding to a low-order language model and a differential language model, which saves computing resources and storage resources without losing decoding accuracy. In addition, decoding a current audio frame according to a decoding result of a previous audio frame improves the decoding speed.

Figure 7:
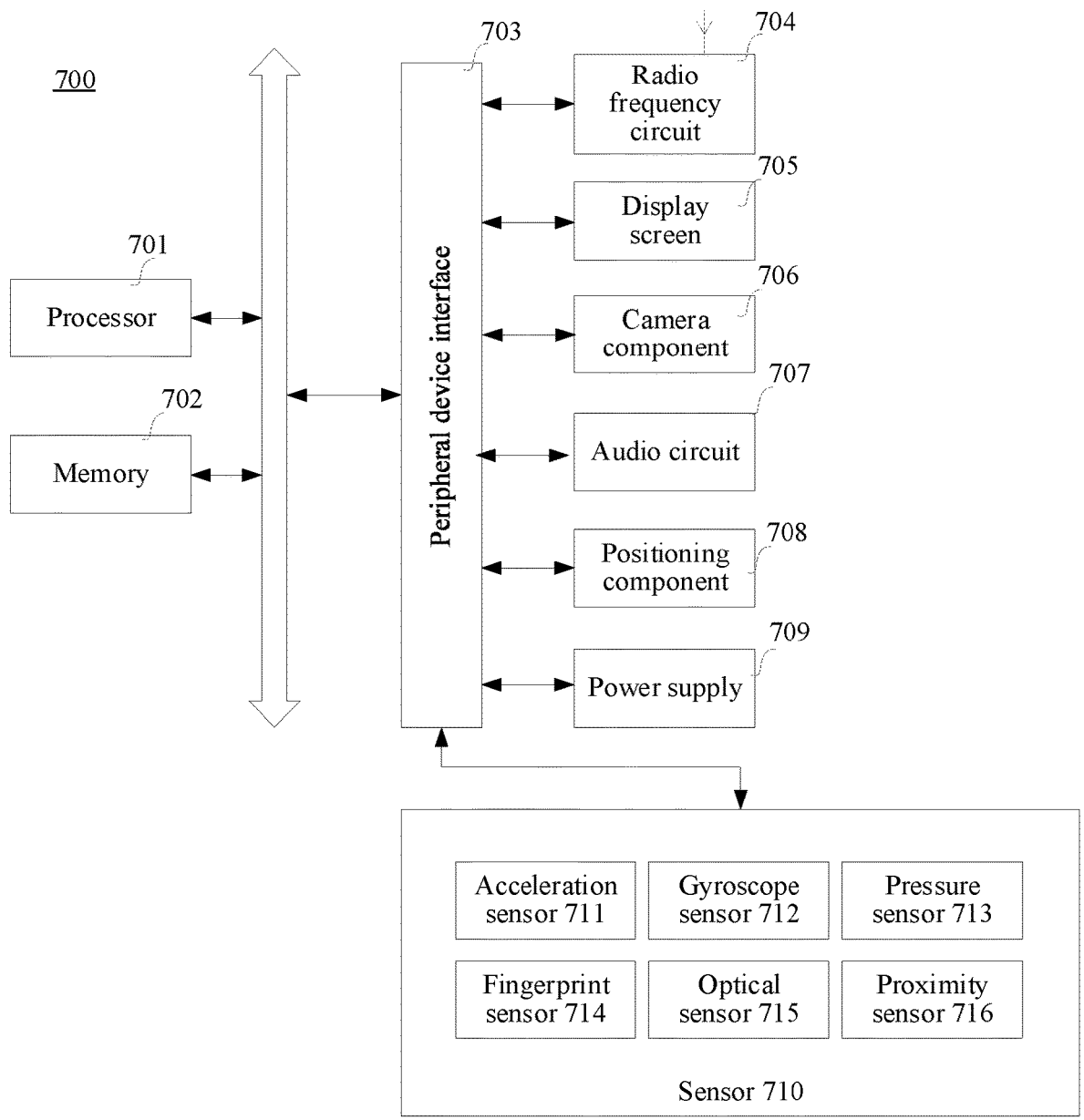
FIG. 7 is a structural block diagram of a computer device specifically implemented as a terminal according to an exemplary embodiment of this application.

FIG. 7 is a structural block diagram of a computer device 700 according to an exemplary embodiment of this application. The computer device 700 may be a smartphone, a tablet computer, a Moving Picture Experts Group Audio Layer III (MP3) player, a Moving Picture Experts Group Audio Layer IV (MP4) player, a notebook computer, or a desktop computer. The computer device 700 may be further referred to as another name such as user equipment, a portable terminal, a laptop terminal, or a desktop terminal.

Generally, the computer device 700 includes a processor 701 and a memory 702.

The processor 701 may include one or more processing cores, and may be, for example, a 4-core processor or an 8-core processor. The processor 701 may be implemented in at least one hardware form of digital signal processing (DSP), a field programmable gate array (FPGA), and a programmable logic array (PLA). The processor 701 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 701 may be integrated with a graphics processing unit (GPU). The GPU is configured to be responsible for rendering and drawing content to be displayed by a display screen. In some embodiments, the processor 701 may further include an artificial intelligence (AI) processor. The AI processor is configured to process a calculation operation related to machine learning.

The memory 702 may include one or more computer-readable storage media. The computer-readable storage medium tangible may be non-transient. The memory 702 may further include a high-speed random access memory and a nonvolatile memory, for example, one or more disk storage devices, or flash memory devices. In some embodiments, the non-transitory computer-readable storage medium in the memory 702 is configured to store at least one instruction, and the at least one instruction being configured to be executed by the processor 701 to implement the speech decoding method provided in the method embodiments of this application.

In some embodiments, the computer device 700 further optionally includes a peripheral device interface 703 and at least one peripheral device. The processor 701, the memory 702 and the peripheral device interface 703 may be connected by a bus or a signal line. Each peripheral device may be connected to the peripheral device interface 703 by the bus, the signal line, or a circuit board. Specifically, the peripheral device includes: at least one of a radio frequency circuit 704, a touch display screen 705, a camera component 706, an audio circuit 707, a positioning component 708, and a power supply 709.

The peripheral device interface 703 may be configured to connect input/output (I/O) related at least one peripheral device to the processor 701 and the memory 702. In some embodiments, the processor 701, the memory 702 and the peripheral device interface 703 are integrated on a same chip or circuit board. In other some embodiments, any one or both of the processor 701, the memory 702, and the peripheral device interface 703 may be implemented on a single chip or the circuit board. This is not limited in this embodiment.

The RF circuit 704 is configured to receive and transmit an RF signal, also referred to as an electromagnetic signal. The RF circuit 704 communicates with a communication network and another communication device by using the electromagnetic signal. The RF circuit 704 converts an electrical signal into the electromagnetic signal to send, or converts a received electromagnetic signal into the electrical signal. Optionally, the RF circuit 704 includes: an antenna system, an RF transceiver, one or more amplifiers, a tuner, an oscillator, a digital signal processor, a codec chip set, a subscriber identity module card, memory, and the like. The RF circuit 704 may communicate with other terminals through at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In some embodiments, the RF circuit 704 may also include a circuit related to near field communication (NFC). This is not limited in this application.

The display screen 705 is configured to display a user interface (UI). The UI may include a graph, text, an icon, a video, and any combination thereof. When the display screen 705 is a touch display screen, the display screen 705 also has the capability to collect a touch signal on or above a surface of the display screen 705. The touch signal may be inputted into the processor 701 as a control signal for processing. In this case, the display screen 705 may be further configured to provide a virtual button and/or a virtual keyboard, also referred to as a soft button and/or a soft keyboard. In some embodiments, there is one display screen 705, disposed on a front panel of the computer device 700. In some other embodiments, there may be at least two display screens 705, respectively disposed on different surfaces of the computer device 700 or designed in a foldable shape. In still some other embodiments, the display screen 705 may be a flexible display screen, disposed on a curved surface or a folded surface of the computer device 700. The display screen 705 may also be set to a non-rectangular irregular pattern, that is, a special-shaped screen. The display screen 705 may be manufactured by using a material such as a liquid crystal display (LCD), an organic light-emitting diode (OLED), or the like.

The camera component 706 is configured to capture an image or a video. Optionally, the camera assembly 706 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting functions through fusion of the main camera and wide-angle camera, or another fusion shooting function. In some embodiments, the camera component 706 may further include a flash. The flash may be a monochrome temperature flash, or may be a double color temperature flash. The double color temperature flash refers to a combination of a warm flash and a cold flash, and may be configured to perform light ray compensation at different color temperatures.

The audio circuit 707 may include a microphone and a speaker. The microphone is configured to collect a sound wave of a user and an environment, and convert the sound wave into the electrical signal to input to the processor 701 for processing, or to input to the radio frequency circuit 704 for implementing speech communication. For the purpose of stereo sound collection or noise reduction, there may be a plurality of microphones, respectively disposed at different parts of the computer device 700. The microphone may alternatively be a microphone array or an omnidirectional collection microphone. The speaker is configured to convert the electrical signal from the processor 701 or the radio frequency circuit 704 into the sound wave. The speaker may be a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and the like. In some embodiments, the audio frequency circuit 707 may also include an earphone jack.

The positioning component 708 is configured to determine a current geographic location of the computer device 700 through positioning, to implement navigation or a location based service (LBS). The positioning component 708 may be a positioning component based on a global positioning system (GPS) of the United States, a COMPASS System of China, a GLONASS System of Russia, or a GALILEO System of the European Union.

The power supply 709 is configured to supply power to components in the computer device 700. The power supply 709 may be an alternating current, a direct current, a disposable battery, or a rechargeable battery. When the power source 709 includes the rechargeable battery, the rechargeable battery may be a wired rechargeable battery or a wireless rechargeable battery. The rechargeable battery may be further configured to support a fast charging technology.

In some embodiments, the computer device 700 further includes one or more sensors 710. The one or more sensors 710 include, but are not limited to: an acceleration sensor 711, a gyro sensor 712, a pressure sensor 713, a fingerprint sensor 714, an optical sensor 715, and a proximity sensor 716.

The acceleration sensor 711 may detect accelerations on three coordinate axes of a coordinate system established by the computer device 700. For example, the acceleration sensor 711 may be configured to detect a component of gravity acceleration on the three coordinate axes. The processor 701 may control, according to a gravity acceleration signal collected by the acceleration sensor 711, the touch display screen 705 to display the user interface in a frame view or a portrait view. The acceleration sensor 711 may be further configured to collect motion data of a game or a user.

The gyroscope sensor 712 may detect a body direction and a rotation angle of the computer device 700. The gyroscope sensor 712 may cooperate with the acceleration sensor 711 to collect a 3D action by the user on the computer device 700. The processor 701 may implement the following functions according to the data collected by the gyro sensor 712: motion sensing (such as changing the UI according to a tilt operation of the user), image stabilization at shooting, game control, and inertial navigation.

The pressure sensor 713 may be disposed on a side frame of the computer device 700 and/or a lower layer of the touch display screen 705. In a case that the pressure sensor 713 is disposed on the side frame of the computer device 700, a holding signal of the user on the computer device 700 may be detected. The processor 701 performs left and right hand recognition or a quick operation according to the holding signal collected by the pressure sensor 713. When the pressure sensor 713 is disposed on the low layer of the touch display screen 705, the processor 701 controls, according to a pressure operation of the user on the touch display screen 705, an operable control on the UI. The operable control includes at least one of a button control, a scroll bar control, an icon control, and a menu control.

The fingerprint sensor 714 is configured to collect a fingerprint of a user, and the processor 701 recognizes an identity of the user according to the fingerprint collected by the fingerprint sensor 714, or the fingerprint sensor 714 recognizes the identity of the user based on the collected fingerprint. When identifying that the user's identity is a trusted identity, the processor 701 authorizes the user to perform related sensitive operations. The sensitive operations include: unlocking a screen, viewing encryption information, downloading software, paying and changing a setting, and the like. The fingerprint sensor 714 may be disposed on a front face, a back face, or a side face of the computer device 700. When a physical button or a vendor logo is disposed on the computer device 700, the fingerprint sensor 714 may be integrated together with the physical button or the vendor logo.

The optical sensor 715 is configured to collect ambient light intensity. In an embodiment, the processor 701 may control display brightness of the touch display 705 according to the ambient light intensity collected by the optical sensor 715. Specifically, when the ambient light intensity is relatively high, the display luminance of the display screen 705 is increased. When the ambient light intensity is relatively low, the display luminance of the display screen 705 is reduced. In another embodiment, the processor 701 may further dynamically adjust a camera parameter of the camera component 706 according to the ambient light intensity collected by the optical sensor 715.

The proximity sensor 716, also referred to as a distance sensor, is usually disposed on the front panel of the computer device 700. The proximity sensor 716 is configured to collect a distance between a front face of the user and the front face of the computer device 700. In an embodiment, when the proximity sensor 716 detects that the distance between the front face of the user and the front face of the computer device 700 is gradually decreased, the processor 701 controls the touch display screen 705 to switch from a screen-on state to a screen-off state. When the proximity sensor 716 detects that the distance between the front face of the user and the front face of the computer device 700 is gradually increased, the processor 701 controls the touch display screen 705 to switch from the screen-off state to the screen-on state.

A person skilled in the art may understand that the structure shown in FIG. 7 does not constitute any limitation on the computer device 700, and the computer device may include more components or fewer components than those shown in the figure, or some components may be combined, or a different component deployment may be used.

According to the computer device provided in the embodiments of this application, a decoding network corresponding to a high-order language model does not need to be generated, and decoding can be performed based on a decoding network corresponding to a low-order language model and a differential language model, which saves computing resources and storage resources without losing decoding accuracy. In addition, decoding a current audio frame according to a decoding result of a previous audio frame improves the decoding speed.

An embodiment of this application provides a non-volatile computer-readable storage medium. The storage medium stores computer-readable instructions, and the computer-readable instructions are executed by a processor to perform the speech decoding method according to the foregoing embodiments.

According to the computer-readable storage medium provided in the embodiments of this application, a decoding network corresponding to a high-order language model does not need to be generated, and decoding can be performed based on a decoding network corresponding to a low-order language model and a differential language model, which saves computing resources and storage resources without losing decoding accuracy. In addition, decoding a current audio frame according to a decoding result of a previous audio frame improves the decoding speed.

When the speech decoding apparatus provided in the foregoing embodiment performs speech decoding, only divisions of the foregoing functional modules are described by using an example. During actual application, the foregoing functions may be allocated to and completed by different functional modules according to requirements, that is, the internal structure of the speech decoding apparatus is divided into different functional modules, to complete all or some of the foregoing described functions. In addition, embodiments of the speech decoding apparatus and embodiments of the speech decoding method provided above belong to the same conception. For the specific implementation process, reference may be made to the method embodiments, and details are not repeated herein.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method of decoding a speech performed by a computer device, the speech comprising a current audio frame and a previous audio frame; and the method comprising:
    obtaining a first decoding network corresponding to a low-order language model and a second decoding network corresponding to a differential language model, wherein the low-order language model and the differential language model are based on one high-order language model and the differential language model is derived from performing differential calculation on the high-order language model and the low-order language model;
    decoding the previous audio frame using the low-order language model in the first decoding network and using the differential language model in the second decoding network to obtain a first token list, each first token in the first token list comprising a state pair associated with the previous audio frame and a decoding score corresponding to the state pair, the state pair including a first state associated with the low-order language model in the first decoding network and a second state associated with the differential language model in the second decoding network;
    identifying, among the first token list, a target token having a smallest decoding score;
    determining pruning parameters according to the smallest decoding score of the target token and an acoustic vector of the current audio frame when the current audio frame is decoded, the pruning parameters being used for restricting a decoding process of the current audio frame, further including:
        determining a first pruning parameter according to the smallest decoding score of the target token;
        inputting the acoustic vector into the first decoding network, traversing non-empty input edges in the first decoding network by using a first state of the target token as a start state, and updating a second initial pruning parameter according to a first decoding path formed by each non-empty input edge, to obtain a second pruning parameter; and
        rescoring the first decoding path formed by the non-empty input edge in the second decoding network by using a second state of the target token as a start state, and updating a third initial pruning parameter according to a rescoring result, to obtain a third pruning parameter; and
    decoding the current audio frame using the low-order language model in the first decoding network and using the differential language model in the second decoding network according to the first token list, the pruning parameters, and the acoustic vector.

2. The method according to claim 1, wherein the updating a second initial pruning parameter according to a first decoding path formed by each non-empty input edge, to obtain the second pruning parameter comprises:
    for the first decoding path formed by the non-empty input edge, obtaining a first acoustic score of the first decoding path under an acoustic model; and
    updating the second initial pruning parameter according to a score determined by the first acoustic score and the smallest decoding score corresponding to the target token, to obtain the second pruning parameter.

3. The method according to claim 1, wherein the rescoring the first decoding path formed by the non-empty input edge in the second decoding network, and updating a third initial pruning parameter according to a rescoring result, to obtain the third pruning parameter comprises:
    for the first decoding path formed by the non-empty input edge, obtaining a first acoustic score of the first decoding path under an acoustic model;
    obtaining a first path score of the first decoding path in the first decoding network;
    obtaining a first rescoring score of the first decoding path in the second decoding network; and
    updating the third initial pruning parameter according to a score determined by the first acoustic score, the first path score, the first rescoring score and the decoding score corresponding to the target token, to obtain the third pruning parameter.

4. The method according to claim 1, wherein the decoding the current audio frame according to the first token list, the pruning parameters, and the acoustic vector comprises:
    inputting the acoustic vector into the first decoding network, and traversing each first token in the first token list;
    for any first token, determining whether to skip the first token according to a decoding score corresponding to the first token and the first pruning parameter;
    when it is determined to execute the first token according to the first pruning parameter, traversing non-empty input edges in the first decoding network by using the first state of the first token as a start state, and determining whether to skip the first token according to the second pruning parameter and a second decoding path formed by each non-empty input edge;

when it is determined to execute the first token according to the second pruning parameter, rescoring the second decoding path formed by the non-empty input edge in the second decoding network by using the second state of the first token as a start state, and determining whether to skip the first token according to a rescoring result and the third pruning parameter;

when it is determined to execute the first token according to the third pruning parameter, obtaining a second token by performing a state jump on the first token, the second token comprising an updated state pair and a decoding score;

combining second tokens corresponding to all the first tokens into a second token list; and determining a second token with a smallest decoding score in the second token list as a decoding result of the current audio frame.

5. The method according to claim 4, wherein the determining whether to skip the first token according to the second pruning parameter and a second decoding path formed by each non-empty input edge comprises:

for the second decoding path formed by the non-empty input edge, obtaining a second acoustic score of the second decoding path under an acoustic model; and when a score determined by the second acoustic score and the decoding score corresponding to the first token is greater than the second pruning parameter, skipping the first token; otherwise, executing the first token.

6. The method according to claim 5, further comprising:
when a score determined by the second acoustic score and the smallest decoding score corresponding to the first token is less than the second pruning parameter, updating the second pruning parameter.

7. The method according to claim 4, wherein the rescoring the second decoding path formed by the non-empty input edge in the second decoding network, and determining whether to skip the first token according to a rescoring result and the third pruning parameter comprises:

for the second decoding path formed by the non-empty input edge, obtaining a second acoustic score of the second decoding path under an acoustic model;

when no word output point exists on the non-empty input edge, obtaining a second path score of the second decoding path in the first decoding network, the word output point comprising a Chinese character output position; and when a score determined by the decoding score of the first token, the second path score, and the second acoustic score is greater than the third pruning parameter, skipping the first token; otherwise, executing the first token.

8. The method according to claim 7, further comprising:
when a score determined by the smallest decoding score of the first token, the second path score, and the second acoustic score is less than the third pruning parameter, updating the third pruning parameter.

9. The method according to claim 4, wherein the rescoring the second decoding path formed by the non-empty input edge in the second decoding network, and determining whether to skip the first token according to a rescoring result and the third pruning parameter comprises:

for the second decoding path formed by any non-empty input edge, obtaining a second acoustic score of the second decoding path under an acoustic model;

when a word output point exists on the non-empty input edge, obtaining a second path score of the second decoding path in the first decoding network;

obtaining a second rescoring score of the second decoding path in the second decoding network; and when a score determined by the decoding score of the first token, the second path score, the second acoustic score, and the second rescoring score is greater than the third pruning parameter, skipping the first token; otherwise, executing the first token.

10. The method according to claim 9, further comprising:
when a score determined by the decoding score of the first token, the second path score, the second acoustic score, and the second rescoring score is less than the third pruning parameter, updating the third pruning parameter.

11. The method according to claim 9, wherein the obtaining a second token by performing a state jump on the first token comprises:

performing a state jump on the first state in the first token according to a traversal result in the first decoding network, to obtain an updated first state;

performing a state jump on the second state in the first token according to the rescoring result in the second decoding network, to obtain an updated second state;

combining the updated first state and the updated second state into the state pair of the second token; and determining the decoding score corresponding to the second token according to the path score in the first decoding network, the rescoring score in the second decoding network, the second acoustic score under the acoustic model, and the decoding score corresponding to the first token.

12. A computer device, comprising a processor and a memory, the memory storing computer-readable instructions for decoding a speech including a current audio frame and a previous audio frame, the computer-readable instructions, when executed by the processor, causing the computer device to perform a plurality of operations including:

obtaining a first decoding network corresponding to a low-order language model and a second decoding network corresponding to a differential language model, wherein the low-order language model and the differential language model are based on one high-order language model and the differential language model is derived from performing differential calculation on the high-order language model and the low-order language model;

decoding the previous audio frame using the low-order language model in the first decoding network and using the differential language model in the second decoding network to obtain a first token list, each first token in the first token list comprising a state pair associated with the previous audio frame and a decoding score corresponding to the state pair, the state pair including a first state associated with the low-order language model in the first decoding network and a second state associated with the differential language model in the second decoding network;

identifying, among the first token list, a target token having a smallest decoding score;

determining pruning parameters according to the smallest decoding score of the target token and an acoustic vector of the current audio frame when the current audio frame is decoded, the pruning parameters being used for restricting a decoding process of the current audio frame, further including:

determining a first pruning parameter according to the smallest decoding score of the target token;

inputting the acoustic vector into the first decoding network, traversing non-empty input edges in the first decoding network by using a first state of the target token as a start state, and updating a second initial pruning parameter according to a first decoding path formed by each non-empty input edge, to obtain a second pruning parameter; and rescoring the first decoding path formed by the non-empty input edge in the second decoding network by using a second state of the target token as a start state, and updating a third initial pruning parameter according to a rescoring result, to obtain a third pruning parameter; and decoding the current audio frame using the low-order language model in the first decoding network and using the differential language model in the second decoding network according to the first token list, the pruning parameters, and the acoustic vector.

13. The computer device according to claim 3, wherein the updating a second initial pruning parameter according to a first decoding path formed by each non-empty input edge, to obtain the second pruning parameter comprises:

for the first decoding path formed by the non-empty input edge, obtaining a first acoustic score of the first decoding path under an acoustic model; and updating the second initial pruning parameter according to a score determined by the first acoustic score and the decoding score corresponding to the target token, to obtain the second pruning parameter.

14. The computer device according to claim 3, wherein the rescoring the first decoding path formed by the non-empty input edge in the second decoding network, and updating a third initial pruning parameter according to a rescoring result, to obtain the third pruning parameter comprises:

for the first decoding path formed by the non-empty input edge, obtaining a first acoustic score of the first decoding path under an acoustic model;

obtaining a first path score of the first decoding path in the first decoding network;

obtaining a first rescoring score of the first decoding path in the second decoding network; and updating the third initial pruning parameter according to a score determined by the first acoustic score, the first path score, the first rescoring score and the decoding score corresponding to the target token, to obtain the third pruning parameter.

15. The computer device according to claim 3, wherein the decoding the current audio frame according to the first token list, the pruning parameters, and the acoustic vector comprises:

inputting the acoustic vector into the first decoding network, and traversing each first token in the first token list;

for any first token, determining whether to skip the first token according to a decoding score corresponding to the first token and the first pruning parameter;

when it is determined to execute the first token according to the first pruning parameter, traversing non-empty input edges in the first decoding network by using the first state of the first token as a start state, and determining whether to skip the first token according to the second pruning parameter and a second decoding path formed by each non-empty input edge;

when it is determined to execute the first token according to the second pruning parameter, rescoring the second decoding path formed by the non-empty input edge in the second decoding network by using the second state of the first token as a start state, and determining whether to skip the first token according to a rescoring result and the third pruning parameter;

when it is determined to execute the first token according to the third pruning parameter, obtaining a second token by performing a state jump on the first token, the second token comprising an updated state pair and a decoding score;

combining second tokens corresponding to all the first tokens into a second token list; and determining a second token with a smallest decoding score in the second token list as a decoding result of the current audio frame.

16. A non-transitory computer-readable storage medium, storing computer-readable instructions for decoding a speech including a current audio frame and a previous audio frame, the computer-readable instructions, when executed by one or more processors of a computer device, causing the computer device to perform a plurality of operations including:

obtaining a first decoding network corresponding to a low-order language model and a second decoding network corresponding to a differential language model, wherein the low-order language model and the differential language model are based on one high-order language model and the differential language model is derived from performing differential calculation on the high-order language model and the low-order language model;

decoding the previous audio frame using the low-order language model in the first decoding network and using the differential language model in the second decoding network to obtain a first token list, each first token in the first token list comprising a state pair associated with the previous audio frame and a decoding score corresponding to the state pair, the state pair including a first state associated with the low-order language model in the first decoding network and a second state associated with the differential language model in the second decoding network;

identifying, among the first token list, a target token having a smallest decoding score;

determining pruning parameters according to the smallest decoding score of the target token and an acoustic vector of the current audio frame when the current audio frame is decoded, the pruning parameters being used for restricting a decoding process of the current audio frame, further including:

determining a first pruning parameter according to the smallest decoding score of the target token;

inputting the acoustic vector into the first decoding network, traversing non-empty input edges in the first decoding network by using a first state of the target token as a start state, and updating a second initial pruning parameter according to a first decoding path formed by each non-empty input edge, to obtain a second pruning parameter; and rescoring the first decoding path formed by the non-empty input edge in the second decoding network by using a second state of the target token as a start state, and updating a third initial pruning parameter according to a rescoring result, to obtain a third pruning parameter; and decoding the current audio frame using the low-order language model in the first decoding network and using the differential language model in the second decoding network according to the first token list, the pruning parameters, and the acoustic vector.

17. The non-transitory computer-readable storage medium according to claim 8, wherein the updating a second initial pruning parameter according to a first decoding path formed by each non-empty input edge, to obtain the second pruning parameter comprises:
- for the first decoding path formed by the non-empty input edge, obtaining a first acoustic score of the first decoding path under an acoustic model; and
- updating the second initial pruning parameter according to a score determined by the first acoustic score and the decoding score corresponding to the target token, to obtain the second pruning parameter.

* * * * *